H. B. BABSON.
VALVE MOUNTING FOR MILKING MACHINES.
APPLICATION FILED JUNE 9, 1919.

1,333,461.

Patented Mar. 9, 1920.

Inventor:
Henry B. Babson
By Cheever & Cox Attys

UNITED STATES PATENT OFFICE.

HENRY B. BABSON, OF CHICAGO, ILLINOIS, ASSIGNOR TO PINE TREE MILKING MACHINE COMPANY, OF CHICAGO, ILLINOIS, A CORPORATION OF ILLINOIS.

VALVE-MOUNTING FOR MILKING-MACHINES.

1,333,461. Specification of Letters Patent. Patented Mar. 9, 1920.

Application filed June 9, 1919. Serial No. 302,701.

*To all whom it may concern:*

Be it known that I, HENRY B. BABSON, a citizen of the United States, residing at Chicago, in the county of Cook and State of Illinois, have invented a certain new and useful Improvement in Valve-Mountings for Milking-Machines, of which the following is a specification.

My invention relates to milking machines and especially to the manually operated valves which control the flow of milk and air from the teat cups to the milk pail. My invention is particularly applicable to that type of milking machine in which each milk pail is provided with and connected to two different clusters or sets of teat cups so that two cows may be milked at the same time and the milk collected in a single pail. In the form selected to illustrate the invention, the milk pail cover has a pulsator mounted upon it and the teat cups (not shown) are of the well known type in which a resilient lining or "inflation" is inclosed within a rigid casing, the space between the casing and the lining being subject to the action of pulsatory air and the space within the lining being subject to a gentle but constant vacuum. The duct which leads from the inside of the lining to the milk pail contains this constant vacuum and serves to convey the milk to the pail. Good practice demands, of course, that a valve be provided for each of these ducts and it also requires that each of the valves shall be readily removable for cleaning purposes. The valves are usually of the same general size and shape, but in order to prevent leakage it is found advisable to specially fit, by grinding or otherwise, each valve to its individual seat, hence the valves ordinarily do not function well if they are accidentally interchanged; consequently it has been the custom to make the valves in such manner that the user will know which valve belongs in a particular seat. For example, the letter "A" may be marked upon a valve and the same letter at a convenient point near the seat to which the valve belongs; while the letter "B" may be marked upon the other valve and the same letter marked at a convenient point near the seat to which the latter valve belongs. But if the operator is careless or in a hurry, he is apt to place the valves in the wrong seats, and it is an object of my invention to render it impossible to thus wrongly place the valves. Another object is to so construct the means by which wrong insertion is prevented that said means will also prevent the valves from being accidentally lifted from their seats when the milkers are in operation.

I obtain my objects by the mechanism illustrated in the accompanying drawings in which—

Figure 1 is a perspective view of a milk pail cover embodying my invention. The manually operated controlling valves are shown in the position which they occupy when the milking machine is in operation. This figure also illustrates the fact that at this time the valves are locked in their seats and hence cannot be accidentally lifted.

Like numerals denote like parts throughout the several views.

Figure 1:
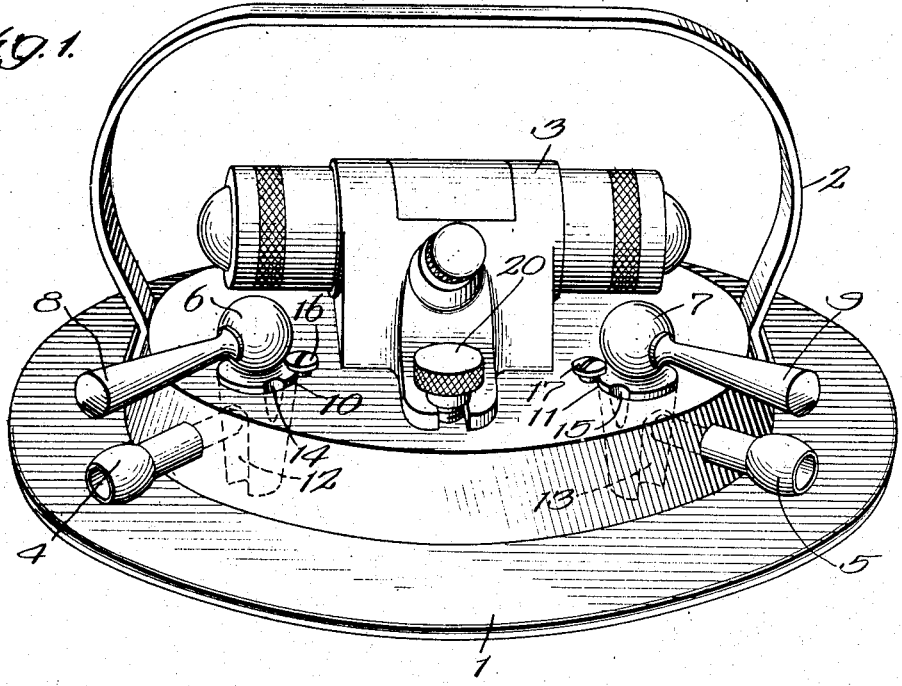

In the form shown in the drawings, the apparatus is of the general type shown in Macartney Patent No. 1,266,697. The milk pail cover 1 is provided with a handle 2 and a pulsator 3. The ducts 4, 5 lead from the inside of the cover to the inside of the lining of the teat cups (not shown). Hence these ducts are under a gentle constant vacuum and convey the milk from the teat cups to the milk pail (not shown). The flow in duct 4 is controlled by a valve 6 while the flow in duct 5 is controlled by a valve 7. These valves are manually operated by means of handles 8 and 9 respectively. Said handles are in reality levers and extend at right angles to the axes of the valves. The valves are preferably tapered—that is, trunco conical, valve 6 fitting in a seat 10 and valve 7 fitting in a seat 11 formed in the top of the pail cover. Valve 6 has a passage 12 in its side so formed and located that when passage registers with the inner end of duct 4 the milk and air can flow freely, but when the valve is rotated to a position to bring the passage out of register with the inner end of the duct, the milk will not be able to flow from the duct into the pail, nor will air be able to flow into the pail through the duct. Consequently when a valve is closed it retains the vacuum that is in the pail. By thus retaining the vacuum in the pail the pail cover will be held down securely by the vacuum alone, unassisted by any mechanical fastening means, that the pail and its contents may be lifted through the agency of the cover. This is a great convenience and is one reason why it is so desirable that the valves fit their seats accurately and prevent leakage of air into the inside of the pail.

The valve 7 has a passage 13 in its side which may be brought into and out of register with the duct 5 in the same way and for the same purpose as the passage 12 may be brought into and out of register with the duct 4.

Figure 2:
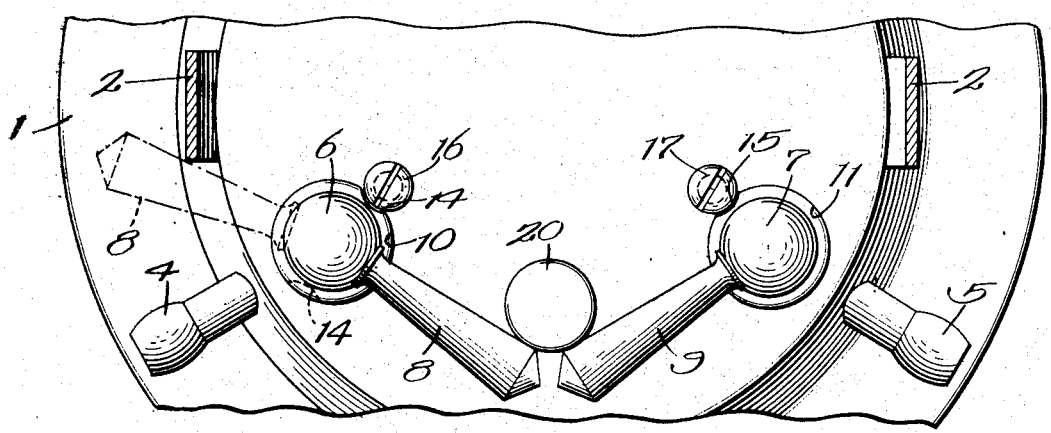
Fig. 2 is a top plan view showing the valves in the position in which they can be raised from their seats.
Figure 3:
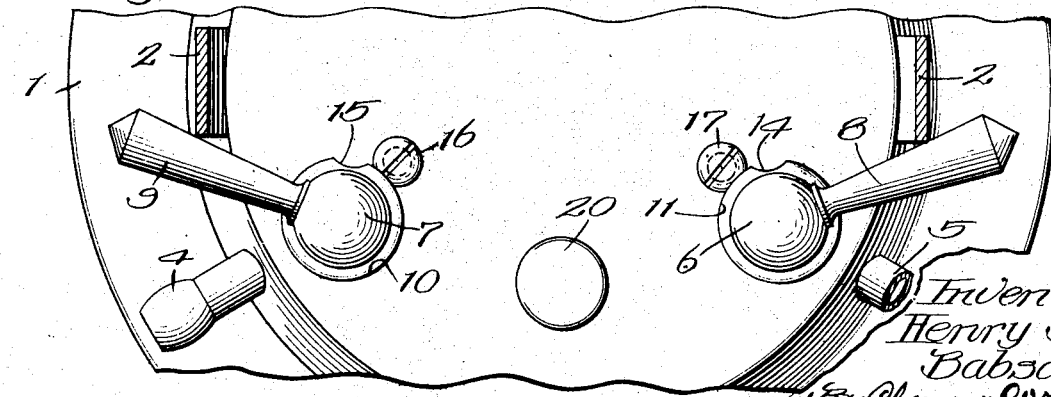
Fig. 3 is a top plan view illustrating the operation of the means for preventing the valve from being lowered onto the wrong seats.

Valve 6 has a groove or recess 14 in its side so placed that when in register with the head of screw 16, as shown in Fig. 2, the valve may be lifted out. Otherwise the head of the screw will project over the shoulder at the top of the valve and prevent it from being raised from or lowered onto its seat. Hence the valve is locked in when the milking machine is in the act of milking.

I prevent interchange of the valves by limiting the angle through which a valve can be rotated and making the valves "right" and "left," and making it possible to raise or insert them only when within their proper angular position. In the present case the lever 8 of valve 6 is limited in one direction by the head of the screw 20 employed in the case shown to hold the pulsator down in position on the top of the pail cover. The swing of the lever in the opposite direction is limited by the handle 2 (see dotted lines Fig. 2). The pulsator itself prevents the valve from being inserted with its lever pointing radially inward toward the center of the cover. The valve 7 has a groove or recess 15 so placed that when it registers with the head of screw 17, as shown in Fig. 2, the valve may be lifted out, but will otherwise be prevented from being raised or lowered. The lever 9 is limited in one direction by screw head 20, and in the other by the handle 2. The screws 16, 17 and the recesses 14, 15 are so placed that the notch 15 cannot be brought to register with the screw 16 by swinging lever 9 to any possible position centered at the valve seat 10. Similarly, the notch 14 cannot be brought to register with the screw 17 by swinging lever 8 to any possible position centered at the valve seat 11. Hence it becomes impossible to improperly assemble the valves and it is made certain that if a valve can be seated at all it is the proper valve for that seat.

It will be noted that the grooves or recesses 14, 15 extend only part way down the side of the valves. This prevents leakage, for the lower portion of the valves is left intact. This is possible of accomplishment due to the fact that the valves are of larger diameter at the top than at the bottom. It will be observed that the screws 16, 17 perform the dual function of preventing improper assemblage and also preventing accidental lifting of the valves while the milking action is taking place.

The proper relative positioning of the screws and recesses 14, 15, 16, and 17 depends in part upon the width of the angle through which the valve handles can swing. By placing the recesses on diametrically opposite sides of the respective valves on a line at right angles to the line of the handle, the valves will be non-interchangeable even though the handles are capable of swinging through an arc of almost 360°.

Attention is called to my copending application, filed June 7, 1919, Serial No. 302,572.

Having thus described my invention what I claim as new and desire to secure by Letters Patent is:—

1. A pail cover for milking machines having a valve seat, a valve rotatably mounted in said seat, and a lock for preventing the removal of the valve from its seat, said lock being operative when the valve is in one position and non-operative when the valve is rotated to another position in its seat, whereby the position of the valve in its seat determines whether or not it can be removed.

2. A pail cover for milking machines having a valve seat, and a valve rotatably mounted in said seat, one part having a projection and the other part a recess through which said projection can pass only when the valve is rotated to a predetermined position, whereby the valve is normally locked in its seat but can be removed by first rotating it to said predetermined position.

3. In an air operated milking machine, a manually operated controlling valve, and a coöperating part having a valve seat wherein said valve is rotatable, said valve and seat being tapered and having bearing surfaces which extend for a considerable distance in the direction of the valve axis, the part having the valve seat having a projection extending radially inward toward the valve axis and the valve having a notch in its side for enabling the valve to pass said projection when rotated to a predetermined position, said notch passing only part way down the side of the valve, in the portion of larger diameter, whereby the portion of smaller diameter is unnotched and therefore completely fits and fills its seat and thereby prevents leakage past it.

4. In an air operated milking machine, a manually operated controlling valve, a coöperating part having a valve seat wherein said valve is rotatable, said valve and cooperating part being provided one with a projection and the other with a notch adapted to pass said projection when the valve is rotated to a predetermined position, whereby the valve can be lowered onto said seat only when the notch and projection register, and means for confining the rotation of said valve to an angle of less than 360° whereby only a valve so constructed that the notch and projection will register when the valve is positioned within said angle, can be lowered onto said seat.

5. In an air operated milking machine, a manually operated rotatable valve for controlling the flow of air and milk to the pail, a coöperating part having a valve seat wherein said valve is rotatable, said coöperating part having a projection and the valve having a notch for accommodating said projection whereby when the valve is rotated to proper position it may be lowered on to its seat, and means for confining the rotation of the valve to an angle less than 360°, whereby unless the notch is so placed on the valve as to register with said projection when the valve is positioned within said angle, the valve cannot be lowered onto said seat.

6. In an air operated milking machine, a pair of manually operated rotatable valves, a coöperating part having two seats, one for each of said valves, said valves being of the same general size and shape, and means for preventing the interchange of said valves with respect to their individual valve seats.

7. In an air operated milking machine, a pair of manually operated rotatable air valves, a coöperating part having two seats, one for each of said valves, said valves being of the same general size and shape, the valves and their seats having mating portions for preventing the seating of the valves unless brought to a predetermined angular position, and means for confining the rotation of said valves to angles of less than 360 degrees, the mating portions of said valves and seats being nonsymmetrically placed with respect to said angles, whereby the valves are non-interchangeable with respect to the two different seats.

8. In an air operated milking machine, a pair of manually operated rotatable valves for controlling the flow of milk and air to the pail, a pail cover having two seats, one for each of said valves, said valves being of the same general size and shape, said valves and their seats having portions which are adapted to interfit to enable the valves to be lowered onto their seats when rotated to a position where said interfitting parts register, handles for rotating said valves, and means for preventing the handles from swinging through an arc of 180°, the handles being so arranged that the valves constitute a "right" and a "left" whereby the valves can be lowered only onto their respective seats, one of said interfitting portions being adapted in each case to prevent the lifting of its valve from its seat except when the interfitting portions are in register with each other.

9. In an air operated milking machine, a milk pail cover, a pair of controlling valves seating in said cover, a handle on each of said valves, means on said cover for limiting the angle through which the valve handles can swing, and means for preventing the lifting of said valves off their seats except when rotated to a definite position, said preventing means consisting of a projection and a recess in each case, one formed on the valve and the other on the pail cover adjacent to the valve, the parts on the valves being located approximately on diametrically opposite sides of the respective valves approximately on a line at right angles to the line of the valve handle.

In witness whereof, I have hereunto subscribed my name.

HENRY B. BABSON.